Figure 4:
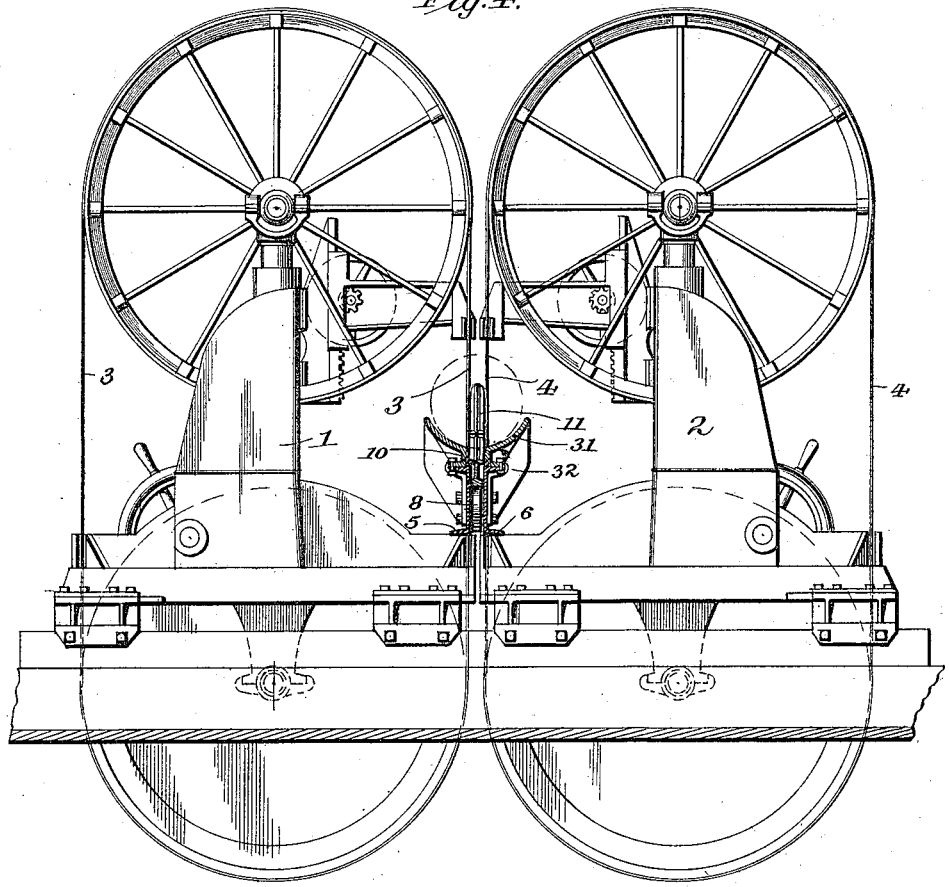

C. E. CLEVELAND.
TWIN BAND SAW MILL.
APPLICATION FILED JUNE 19, 1908.
1,081,525.
Patented Dec. 16, 1913.
6 SHEETS—SHEET 1.
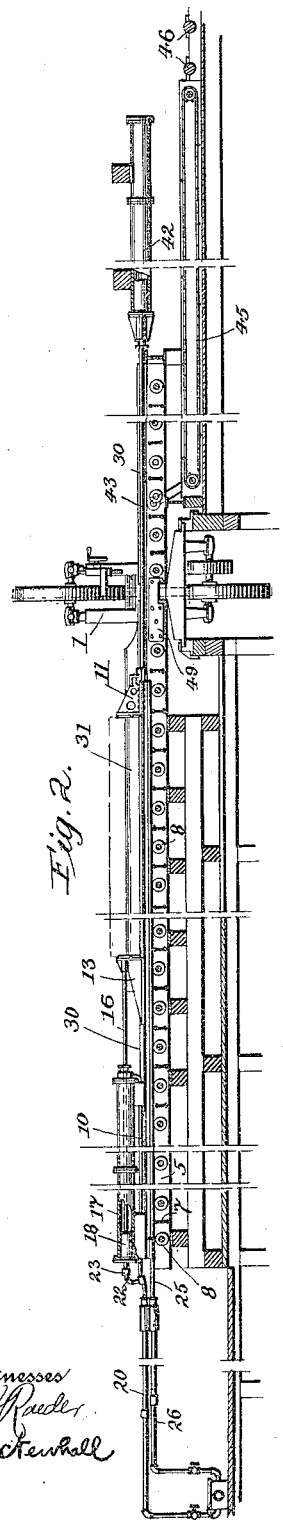
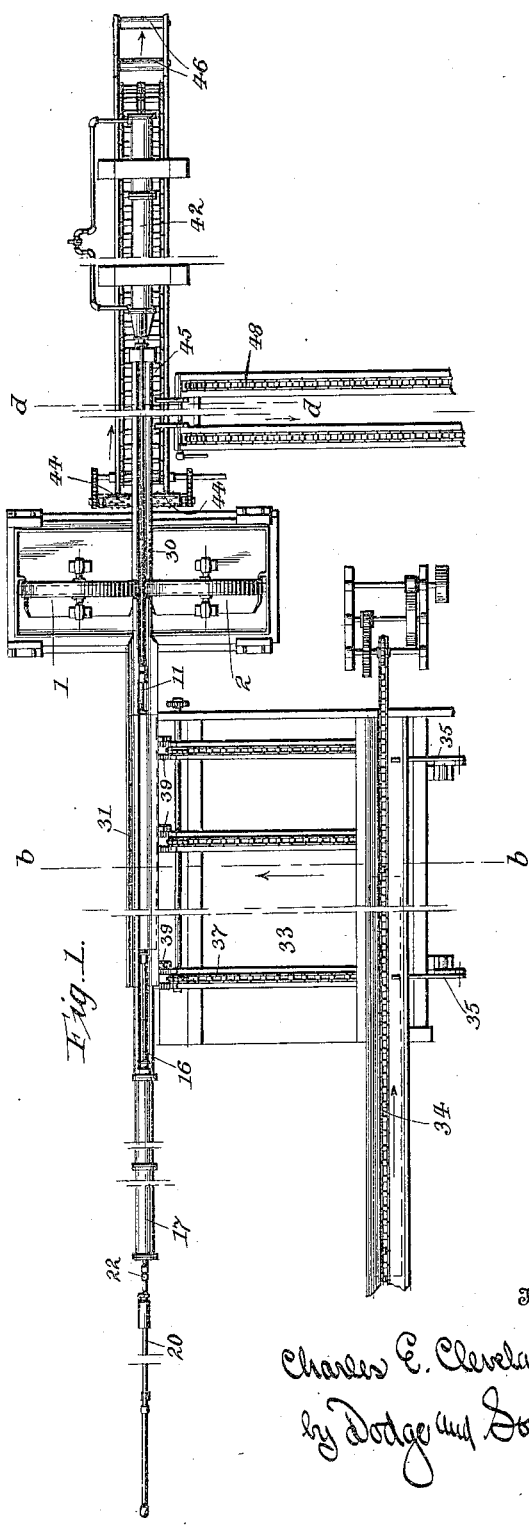
Inventor:
Charles E. Cleveland,
by Dodge and Sons,
Attorneys.

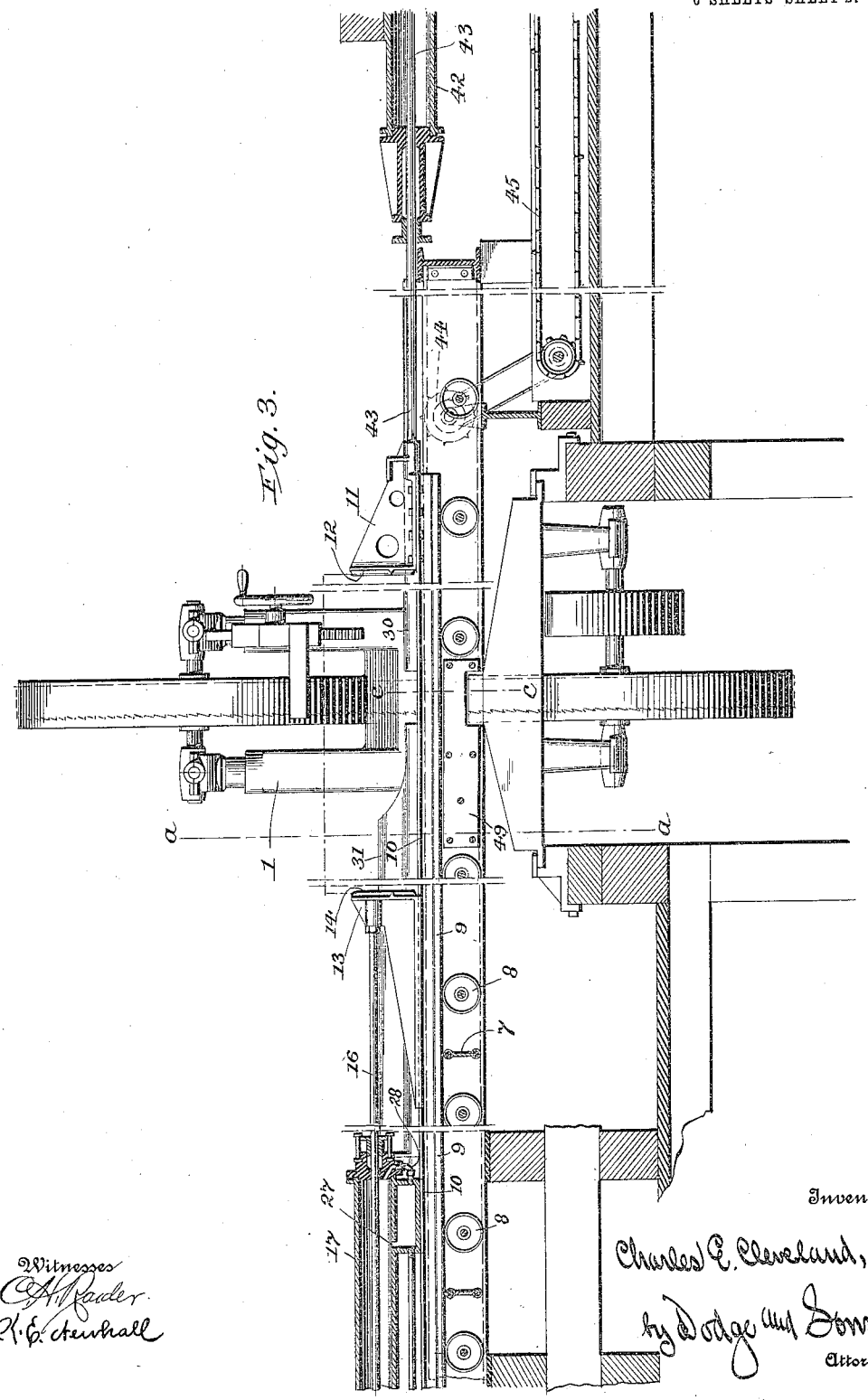

C. E. CLEVELAND.
TWIN BAND SAW MILL.
APPLICATION FILED JUNE 19, 1908.

1,081,525.

Patented Dec. 16, 1913.
6 SHEETS—SHEET 3.

C. E. CLEVELAND.
TWIN BAND SAW MILL.
APPLICATION FILED JUNE 19, 1908.
1,081,525.
Patented Dec. 16, 1913.
6 SHEETS—SHEET 4.
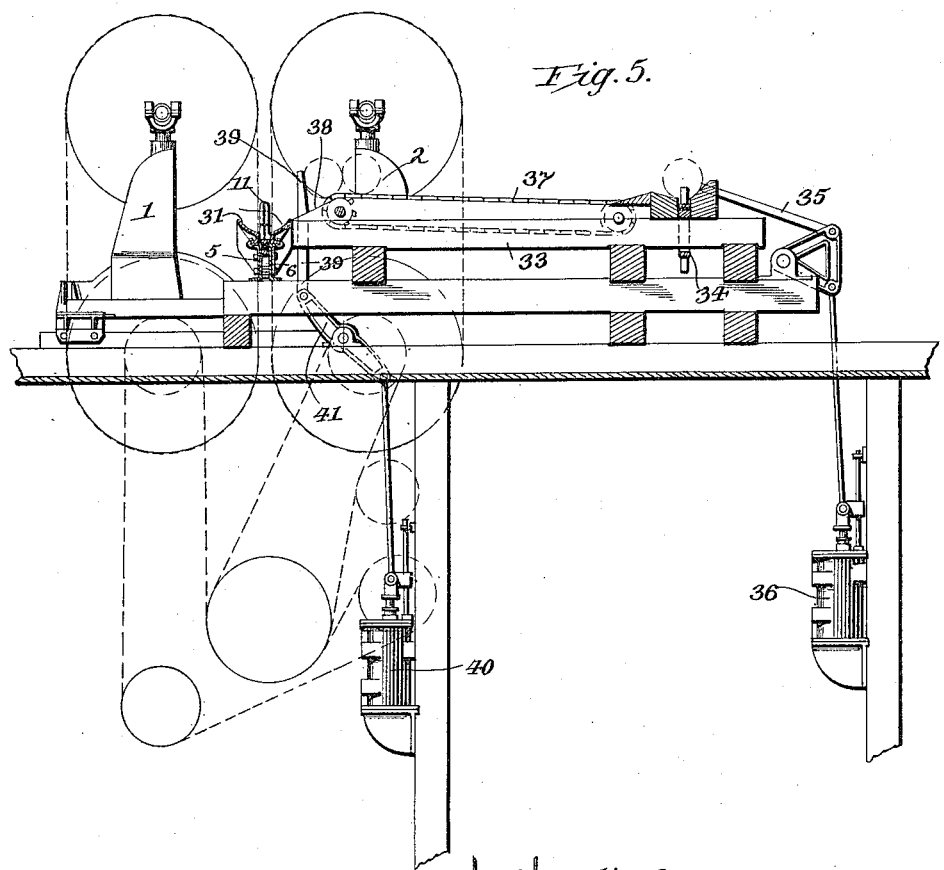
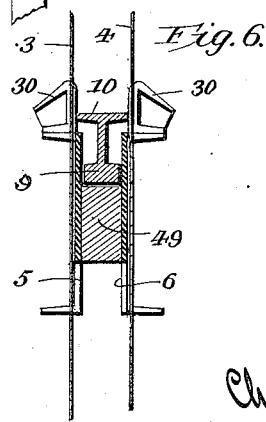

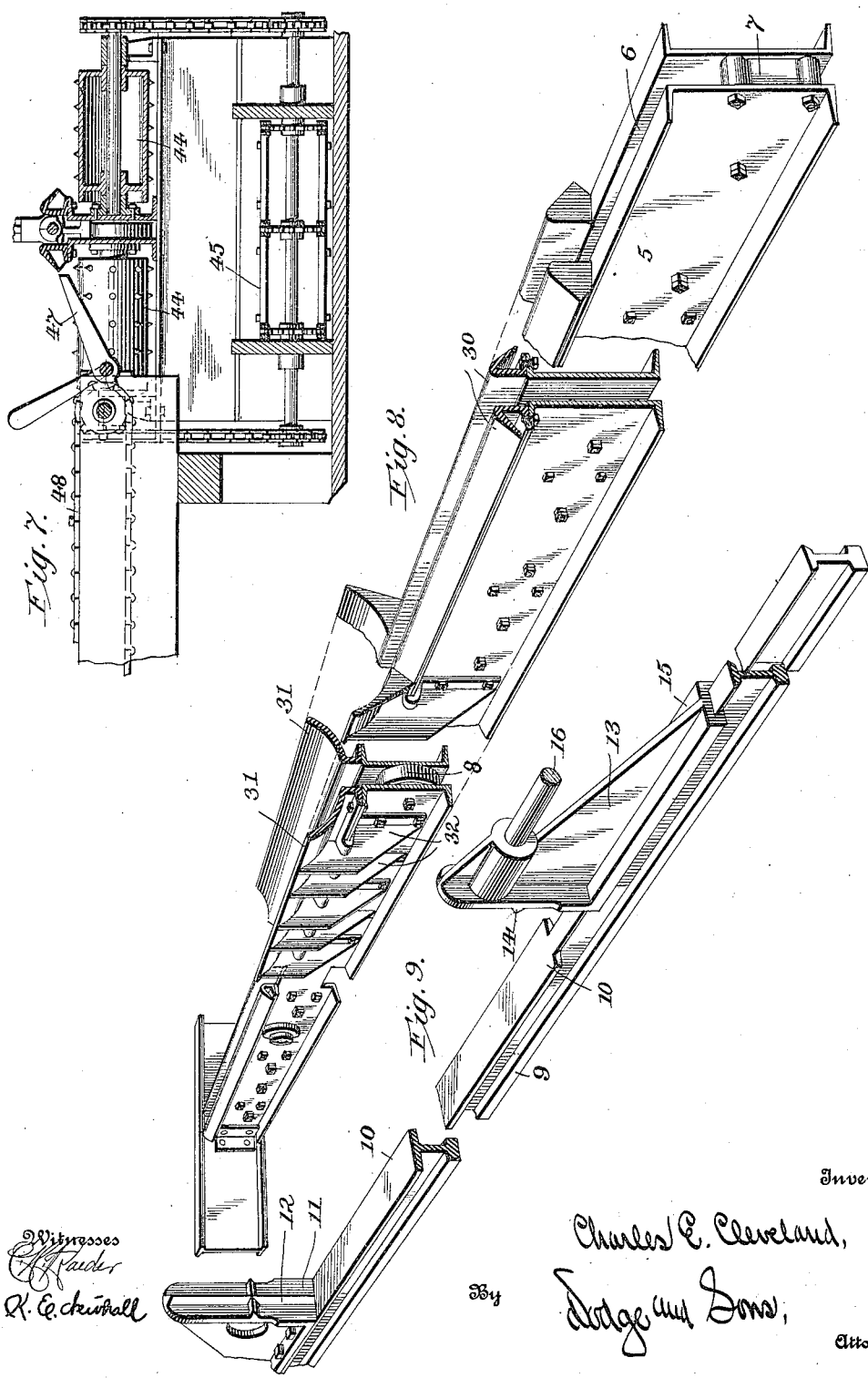

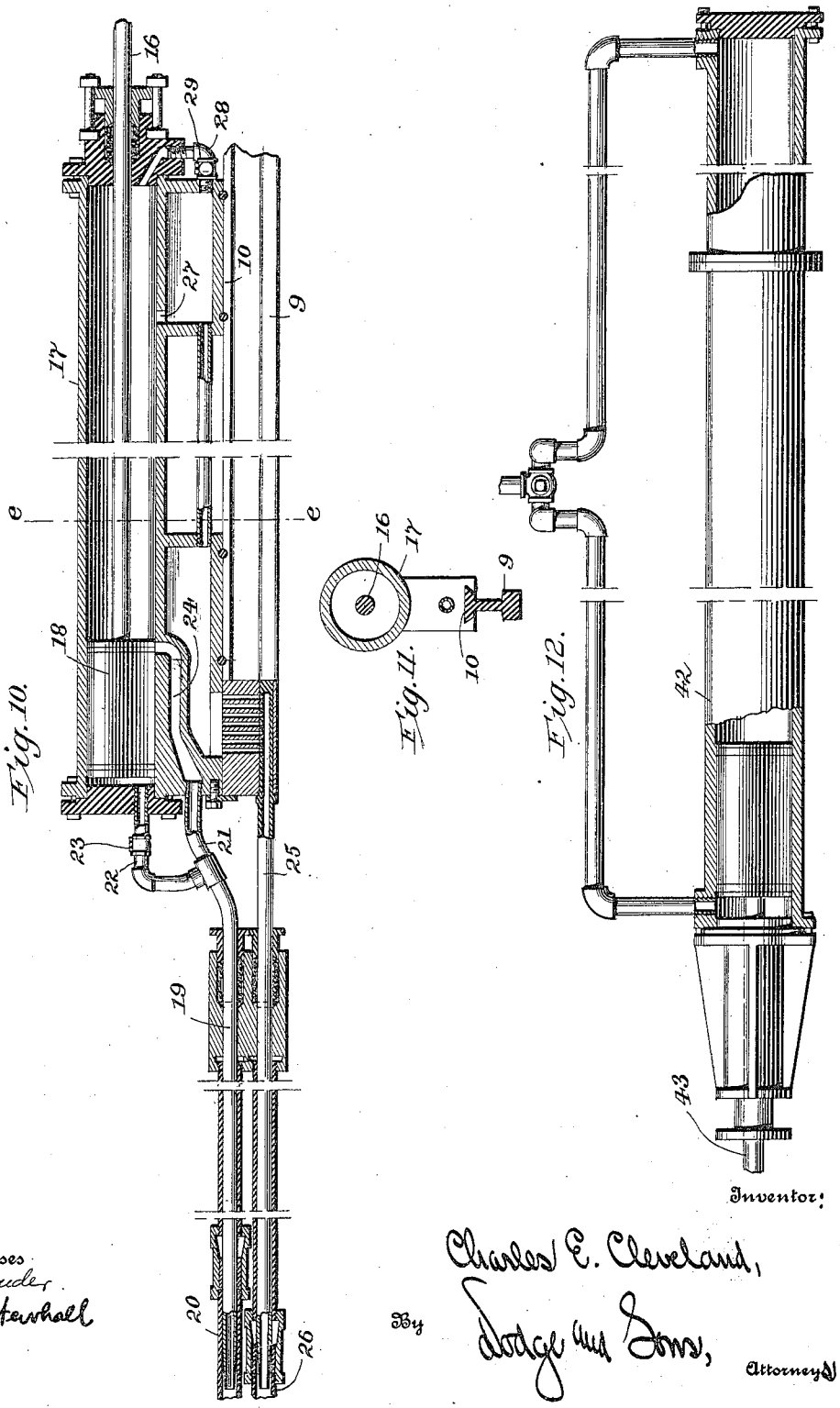

UNITED STATES PATENT OFFICE.

CHARLES E. CLEVELAND, OF FOND DU LAC, WISCONSIN.

TWIN BAND-SAW MILL.

1,081,525. Specification of Letters Patent. Patented Dec. 16, 1913.

Application filed June 19, 1908. Serial No. 439,382.

*To all whom it may concern:*

Be it known that I, CHARLES E. CLEVELAND, a citizen of the United States, residing at Fond du Lac, in the county of Fond du Lac and State of Wisconsin, have invented certain new and useful Improvements in Twin Band-Saw Mills, of which the following is a specification.

My present invention pertains to improvements in twin band saw mills, and has reference more particularly to an improved mechanism for feeding the logs between the saws.

The invention is illustrated in the annexed drawings, wherein:

Figure 1 is a top plan view of the mill; Fig. 2 a vertical longitudinal sectional view thereof; Fig. 3 a similar view of the central portion of the mill, shown upon an enlarged scale; Fig. 4 a transverse vertical sectional view, taken on the line *a—a* of Fig. 3; Fig. 5 a transverse vertical sectional view, taken on the line *b—b* of Fig. 1; Fig. 6 a similar view taken on the line *c—c* of Fig. 3; Fig. 7 a transverse vertical sectional view taken on the line *d—d* of Fig. 1, illustrating the manner in which the cant is removed from the carriage and conveyed away from the machine; Fig. 8 a perspective view of the carriage supporting frame and the trough-shaped member into which the logs are initially introduced prior to being clamped upon the carriage; Fig. 9 a similar view of the carriage; Fig. 10 a detail sectional view of the dogging cylinder and the telescopic pipes which work in conjunction therewith; Fig. 11 a cross-sectional view taken on the line *e—e* of Fig. 10; and Fig. 12 a sectional elevation of the cylinder employed to actuate the carriage.

The main object of the present invention is to provide a simple, effective and positive mechanism for feeding a log between the two saws of a twin saw mill, this object being attained by the employment of a carriage of special form, working in conjunction with suitable dogging mechanism and means for traversing the carriage, with the log clamped thereon, between the saws, whereby a cant and two slabs will be formed.

A further object of the invention is to provide, in conjunction with the carriage, suitable mechanism for feeding the logs thereto and positioning the logs prior to the clamping of the logs upon the carriage.

A still further object of the invention is to provide suitable means for conveying the slabs away from the machine, and likewise transferring the cant from the carriage to a suitable mechanism for removing it from the mill.

With these and other objects in view, a description of the invention may be given.

1 and 2 designate band-mills of any improved type, preferably adjustable toward and from each other, so as to vary the space between the saws 3 and 4 in order to cut a larger or smaller cant. Extending between the saws and throughout the length of the apparatus are two channel-bars 5 and 6, shown in detail in Fig. 8, said bars being spaced apart by filler-blocks 7, see Figs. 3 and 8, and carrying rollers 8, between them upon which the carriage is mounted and travels. The carriage is shown in detail in Fig. 9, and is composed of an inverted railroad rail, the tread 9 of which rests upon the supporting rollers 8, while the flange or base 10 forms the upper part of the carriage and has secured to it at one end a fixed abutment 11, provided with fixed dogs 12, adapted to engage and hold the log when the latter is moved toward the same by the movable slide or dogging member 13, which is likewise provided with teeth 14. In order to permit the movable dogging device 13 to pass between the saws it must, of course, be as narrow as the carriage or as the narrowest space which is left between the saws when they are brought to their closest position. To maintain the narrowness of the member 13, the flange 10 of the rail is cut away, as shown in Fig. 9, so that the base 15 of the movable dog 13 is no wider than the full width of the flange 10.

A piston-rod 16 is connected to the movable dogging device 13, said rod extending into a cylinder 17, shown in detail in Fig. 10, and being connected to a piston 18 mounted therein. A pipe 19, making telescopic connection with a supply pipe 20, is connected with one end of the cylinder through a branch 21, and a second branch 22, the latter opening directly into the end of the cylinder and being provided with a check-valve 23, which permits the free entrance to steam or other agent into the cylinder but prevents backward passage of the fluid therethrough. Branch 21 opens into a port 24, which terminates at a point in advance of the end of the cylinder and thereby forms a pocket for the piston upon the rearward movement thereof, as will be well understood. A pipe 25 makes telescopic connection with a second supply pipe 26, pipe 25 being in communication with a port 27 located at a point distant from the opposite end of the cylinder and likewise with a pipe 28, provided with a check-valve 29, which prevents the return of fluid therethrough, said pipe 28 opening directly into the outer end of the cylinder 17. The port 27 and the port with which the pipe 28 communicates will form a cushion for the piston 18 as it nears the limit of its travel toward the right hand end of the cylinder. The cylinder is fixed to the carriage and moves therewith. The ports are so proportioned, however, that the piston at no time passes between the saws, though the movable dogging member 13 may pass beyond the saw-line to a point adjacent to the mechanism employed for removing the cant and the slabs from the carriage.

Secured to the upper flange of each of the channel bars 5 and 6 are deflector plates 30, the outer upper faces of which are downwardly and outwardly inclined so as to facilitate the discharge of the slabs and cant. They also protect the piston-rod of the carriage-traversing cylinder.

At the forward end of the mill, in advance of the saws, there are secured to the channel bars 5 and 6 segmental members 31, said members when in position forming substantially a trough or cradle, into which a log is introduced preparatory to its being secured upon the carriage. As will be seen upon reference to Fig. 8, each of said members 31 is provided with a downwardly-projecting web and flange 32, which are bolted to and engage the channel bars so as to strengthen the segmental members and prevent them from being broken by the placing of a log thereon.

Standing to one side of the frame, composed of the channel bars, in a log-deck 33, Fig. 1, to which the logs are fed by an endless carrier 34, or the like. The logs, as will be seen upon reference to Fig. 5, are removed from the trough of the endless carrier by push bars 35, actuated by a steam cylinder 36, the logs being moved from the trough by the bars onto the chains 37 of the log-deck and carried by said chains toward the downwardly-inclined ends 38 thereof, which stand adjacent to the trough-shaped member or cradle formed by the segmental members 31. A series of stop bars 39 stand adjacent to the inclined ends 38 and hold the log which has been moved up by the chains from passing into the cradle until the carriage and the movable dogging member are in proper position with relation thereto. When the parts are so positioned the stop bars 39 are withdrawn through the action of the steam cylinder 40 and the pivoted levers 41 which are interposed between the cylinder mechanism and the stop bars, so that the log may roll down the inclined ends 38 and into the cradle. When the log is thus positioned the bars 39 are moved upward and motion is again imparted to the chains 37 to bring another log into place. The log which then lies in the cradle is clamped between the fixed abutment 11 and the movable abutment or dogging member 13 by the admission of steam into the cylinder 17, thereby forcing the movable member 13 against the end of the log and moving it against the abutment or dogging device 11. Continued pressure exerted within the left-hand end of the cylinder will hold the log in its clamped position.

To traverse the carriage, a cylinder 42, see Figs. 1, 2 and 12, is located at the discharge end of the mill, the piston-rod 43 thereof extending between the deflector plates 30 and being connected to the fixed abutment 11 as in Fig. 3, or directly to the carriage, as may be deemed desirable.

Suitable cushioning devices may be used in conjunction with the piston of the cylinder 42 to prevent breakage of the parts.

It will be noted upon an inspection of the drawings that there is no connection between the cylinder used for setting and holding the movable dog and the cylinder 42, employed to traverse the carriage; in other words, these two cylinders are independent of each other, and the dogging devices may be released after the carriage has passed between the saws in order to facilitate the discharge of the cant.

Located adjacent to the framing upon which the mills are mounted are live rolls 44, Figs. 1 and 7, which serve to support the short pieces or slabs and feed them onto a conveyer 45 (Figs. 2 and 7) located beneath the steam cylinder 42, the conveyer discharging the slabs and short pieces onto live rolls 46.

After the log has been passed between the saws, steam is admitted to the right-hand end of the cylinder 17, and the movable dogging device 13 is withdrawn from contact with the cant. The latter is then thrown over onto the arms 47 of a transferring device, see Figs. 1 and 7, which arms are afterward thrown upwardly so as to move the cant onto the traveling chains 48, by which the log is conveyed to any desired point.

The flanges of the channel bars 5 and 6, which compose the frame-work upon which the carriage travels, are cut away at the point where the band saws travel downward, as will be seen upon reference to Fig. 6, and in order to strengthen the channel bars at this point a filling member 49 is interposed and bolted between said members, as shown in Figs. 3 and 6.

As will be readily appreciated, the apparatus herein shown and described is comparatively simple and yet is highly efficient, the logs being fed between the saws with much more certainty than where a chain is depended upon to carry or traverse the logs. The construction is such that the logs may be readily handled and the slabs and cant quickly discharged, in order that the carriage may be traversed rearwardly to a position where a new log may be placed in the trough or cradle between the fixed and movable abutments of the carriage.

Having thus described my invention, what I claim is:

1. In combination with a pair of oppositely-disposed band saw mills; a pair of channel bars extending between the saws of said mills and to each side thereof; a series of rollers interposed between said channel bars; a narrow carriage mounted upon said rollers; a fixed abutment mounted upon the carriage; a movable abutment mounted upon the carriage; an actuating cylinder for the movable abutment, likewise mounted upon the carriage; and a power cylinder for traversing the carriage.

2. In combination with a pair of oppositely-disposed band saw mills; a pair of channel-bars located between the saws of said mills and extending outward to each side thereof; a series of rollers mounted between said channel bars; a carriage resting upon said rollers; a fixed abutment mounted upon the carriage; a movable abutment mounted upon the carriage; an actuating cylinder for the movable abutment, likewise mounted upon the carriage; a trough-shaped member secured upon the upper face of the channel bars to one side of the saw-line, said trough-shaped member being adapted to receive a log or the like and to properly position the same with reference to the fixed and movable abutments of the carriage; and means for traversing the carriage.

3. In combination with a pair of oppositely-disposed saw-mills; a pair of channel bars extending between said mills and to each side thereof; a plurality of rollers mounted between said channel bars; a carriage mounted upon said rollers, said carriage having the form of an inverted railroad rail; a fixed abutment mounted upon one end of said carriage; a movable abutment mounted upon the opposite end of said carriage; a cylinder; a piston-rod working in said cylinder and connected to the movable abutment; means for admitting steam to and exhausting the same from the opposite ends of said cylinder, whereby the movable abutment may be advanced toward and receded from the fixed abutment; and means for actuating said carriage.

4. In combination with a pair of oppositely-disposed saw-mills; a pair of channel bars extending between said mills and to each side thereof; a plurality of rollers mounted between said channel-bars; a carriage mounted upon said rollers, said carriage having the form of an inverted railroad rail; a fixed abutment mounted upon one end of said carriage; a movable abutment mounted upon the opposite end of said carriage; a cylinder; a piston-rod working in said cylinder and connected to the movable abutment; means for admitting steam to and exhausting the same from the opposite ends of said cylinder, whereby the movable abutment may be advanced toward and receded from the fixed abutment; a pair of segmental members secured on the channel bars in advance of the saws, one upon the outer face of each of said bars; an outwardly and downwardly inclined deflector plate supported upon each of the channel bars in rear of the saws; and means for traversing the carriage, said means being independent of the means employed to clamp the log upon the carriage.

In testimony whereof I have signed my name to this specification in the presence of two subscribing witnesses.

CHARLES E. CLEVELAND.

Witnesses:
FRANK J. WOLFF,
H. G. DE SOMBRE.

Copies of this patent may be obtained for five cents each, by addressing the "Commissioner of Patents, Washington, D. C."